Nov. 1, 1949     T. H. OPPENHEIM     2,486,799
AGRICULTURAL MACHINE TRANSMISSION
Filed Oct. 7, 1944     2 Sheets-Sheet 2
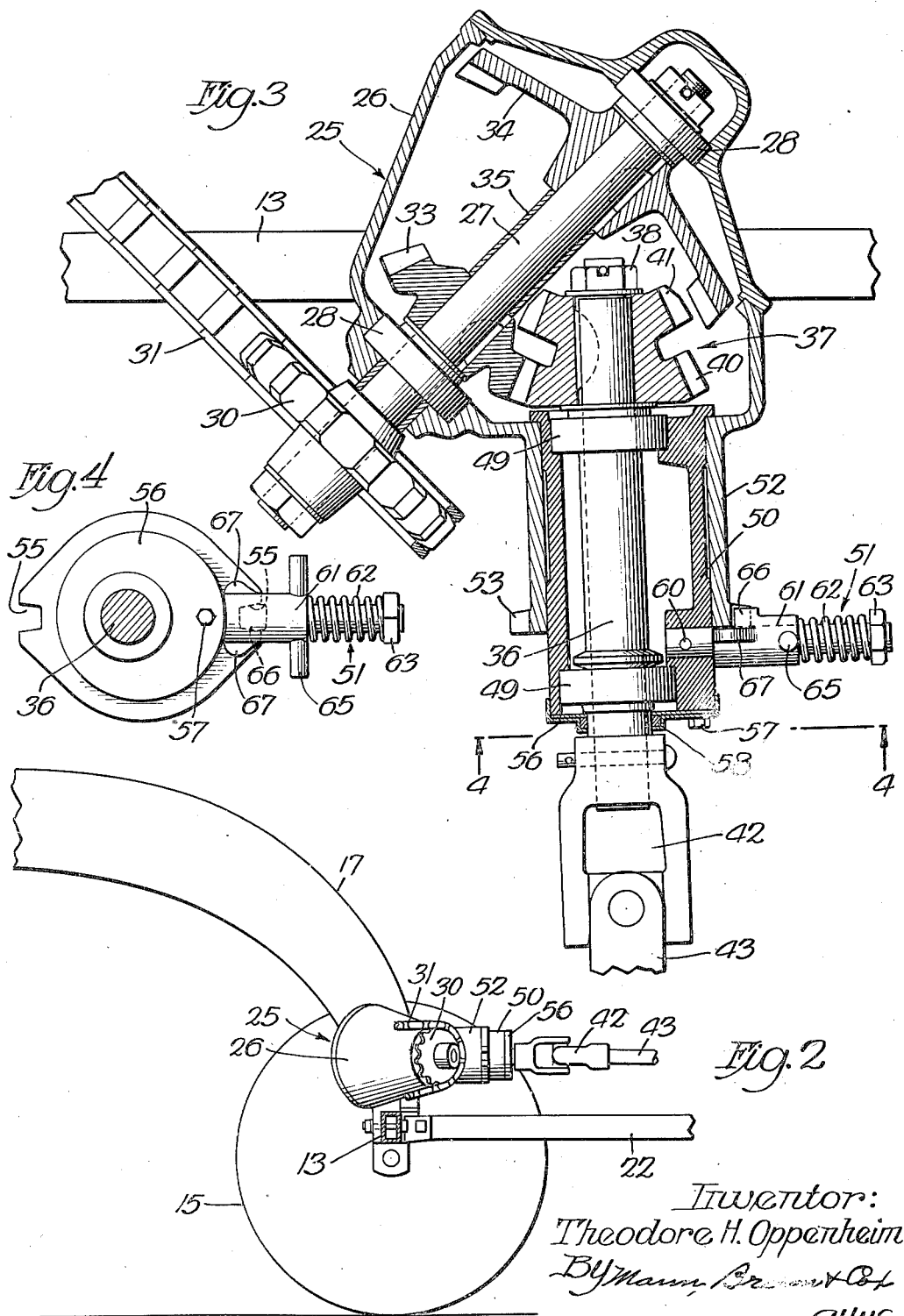
Inventor:
Theodore H. Oppenheim Patented Nov. 1, 1949

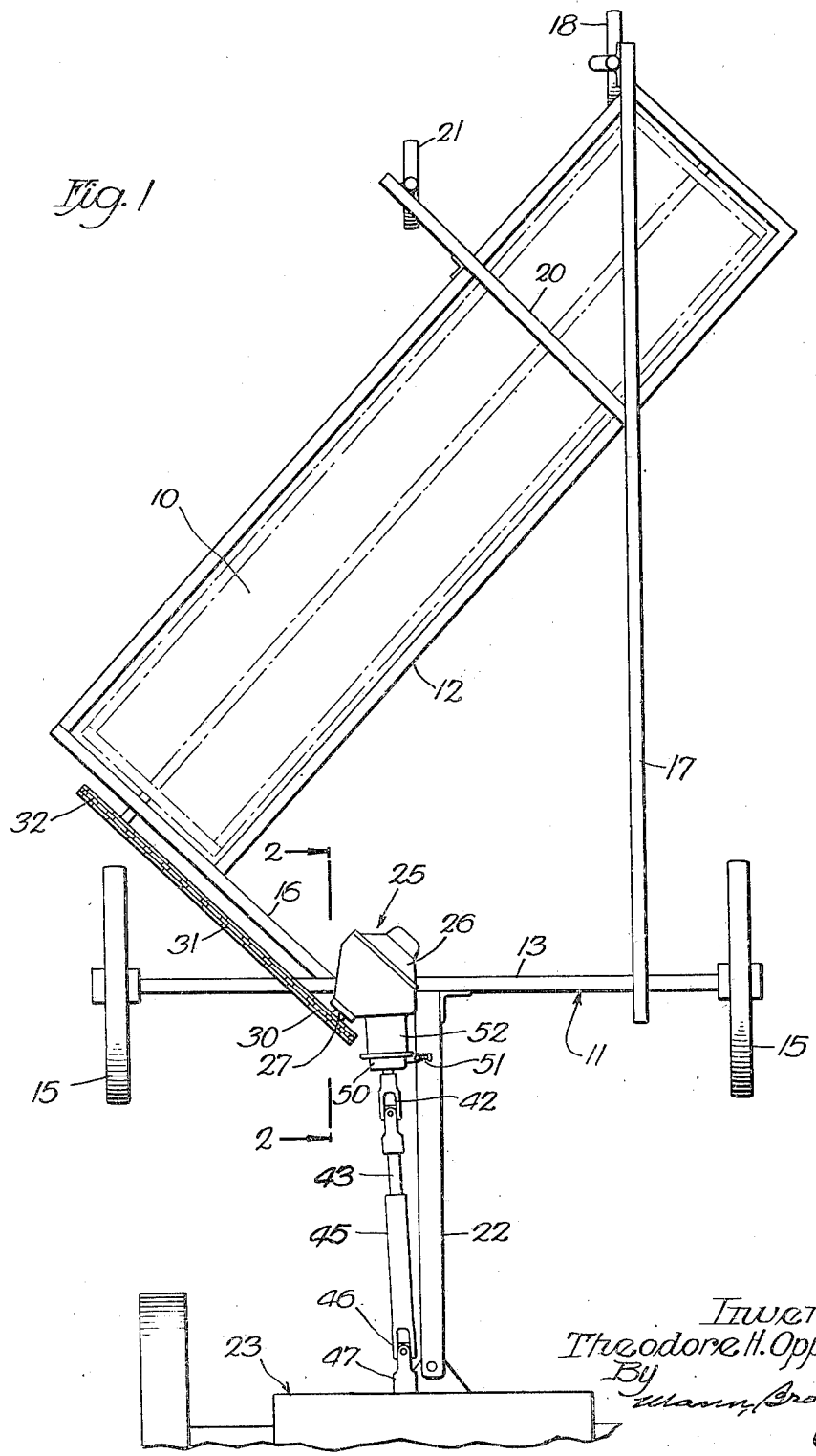

2,486,799

UNITED STATES PATENT OFFICE 2,486,799

AGRICULTURAL MACHINE TRANSMISSION

Theodore H. Oppenheim, Coldwater, Ohio, assignor, by mesne assignments, to Avco Manufacturing Corporation, a corporation of Delaware Application October 7, 1944, Serial No. 557,656

3 Claims. (Cl. 74—355)

My invention is directed to a gear arrangement to be used in an agricultural machine for reversibly rotating a mechanism of the machine. One object of the invention is to provide a simple compact transmission for reversibly interconnecting a power shaft of an agricultural machine and a driven shaft positioned at an acute angle relative thereto. A further object is to provide an efficient compact transmission for connecting a power shaft of an agricultural machine to a driven shaft for selectively driving the driven shaft at one rate in one direction of rotation or at a greater rate in the opposite direction of rotation.

In general, these objects are attained by positioning a driven shaft obliquely of a power shaft with two spaced bevel gears on the driven shaft and an intervening pinion means carried by the power shaft. Relative movement is caused between the power shaft on the one hand and the two spaced gears on the other hand to place the pinion means in mesh with the two gear means selectively.

The invention is applicable with outstanding advantages to a combination of side-delivery rake and tedder and for the purpose of the present disclosure will be so described.

The above and other objects and advantages will be apparent in the description to follow taken with the accompanying drawings.

In the drawings, which are to be regarded as illustrative only,

Fig. 1 is a plan view of a combined rake and tedder incorporating an embodiment of my transmission, Fig. 2 is an enlarged section taken as indicated by the line 2—2 of Fig. 1, Fig. 3 is a view of the transmission partly in plan and partly in section, and Fig. 4 is a section taken as indicated by the line 4—4 of Fig. 3.

The agricultural machine shown in Fig. 1 is a combined rake and tedder having a rotary raking drum or reel 10 which for simplicity is shown diagrammatically as a cylinder. The general construction, and function of the machine as well as the specific construction of the raking drum 10 may follow the teaching of my Patent No. 2,175,088, entitled Combined side delivery rake and tedder, issued October 3, 1939.

Fig. 1 shows a main frame generally designated 11 and a supplemental frame 12 carried by the main frame, the purpose of the supplemental frame being to rotatably support the raking drum 10. The main frame 11 includes the following members: a non-rotatable axle 13 carrying two ground wheels 15, a frame member 16 extending from the axle 13 to the leading end of the supplemental frame 12, a longitudinal frame member or truss 17 extending from the axle 13 across the trailing end of the supplemental frame to a castor 18 and an oblique frame member 20 extending from the truss 17 to a second castor 21. At the forward end of the main frame 11 is a tongue 22 for hitching the agricultural machine to a tractor 23.

The power plant of the tractor 23 is operatively connected to a transmission on the machine generally designated 25 and the transmission is in turn operatively connected to the raking drum 10.

The transmission 25 includes a housing 26 fixedly mounted on the axle 13. As indicated in Fig. 3, a driven shaft 27 substantially parallel with the obliquely positioned raking drum 10 extends into the transmission housing 26 and is journalled therein by a pair of spaced bearings 28. The driven shaft 27 is operatively connected to the raking drum 10 and for this purpose carries a sprocket 30 outside the transmission housing, the sprocket being engaged by a sprocket chain 31 extending to a second sprocket 32 on the raking drum.

Keyed to the driven shaft 27 inside the housing 26 are two driven gears, namely, a forward bevel gear 33 for driving the raking drum 10 in raking direction and a second rearward bevel gear 34 for driving the raking drum 10 in the reverse direction for tedding. Since it is desirable in this instance to rotate the raking drum 10 at relatively high speed in its reverse direction for tedding operation, the rearward bevel gear 34 is of substantially larger effective diameter than the forward bevel gear 33. It is to be noted that the two bevel gears 33 and 34 are spaced substantially apart by a sleeve 35 and have their bevel teeth presented towards the intervening space.

Positioned in the space between the two bevel gears 33 and 34 is the inner end of a power shaft 36 and also a pinion means generally designated 37. The pinion means is keyed to the power shaft and secured by suitable means including a nut 38. In the particular construction shown, the pinion means 37 comprises two bevel pinions 40 and 41 keyed on the shaft 36 and which may be and preferably are integral with each other.

It is contemplated that relative movement between the power shaft 36 on one hand and the two bevel gears 33 and 34 on the other hand will be employed to place the pinion means 37 in mesh with the forward bevel gear 33 or alternatively to place the pinion means in mesh with the rearward bevel gear 34. It is apparent from an inspection of Fig. 3 that this relative movement may be obtained either by moving the power shaft 36 laterally relative to the direction of its axis or by shifting simultaneously the two bevel gears 33 and 34 axially along the driven shaft 27. In the present preferred construction, means is provided for moving the power shaft 36 for meshing the pinion means 37 selectively with the two bevel gears 33 and 34.

To permit the lateral movement of the power shaft 36 required for meshing the pinion means 37 with the two gears 33 and 34 selectively, I may employ some type of universal joint between the power shaft and the power plant in the tractor 23. To accommodate variation in the distance between the tractor power plant and the transmission housing 26 incidental to operation of the apparatus, I also may employ a suitable type of extensile driving connection such as a telescoping arrangement.

In the construction shown in Fig. 1, the power shaft 36 is connected by a universal joint 42 with a short solid shaft 43 of polygonal cross-sectional configuration that is slidingly telescoped into a short hollow shaft 45 of similar configuration. The hollow shaft 45 is in turn connected by a universal joint 46 with the shaft 47 on the tractor engine. Such an arrangement for operatively connecting the tractor power plant with the power shaft 36 provides the required freedom for lateral movement of the power shaft between a position for driving the forward bevel gear 33 and an alternative position for driving the rearward bevel gear 34.

Any suitable means may be employed to mount the power shaft 36 for controlled lateral movement between its two operating positions. A mounting means that simply rocks the power shaft from one of its positions to the other is preferred. In the particular construction shown in detail in Fig. 3, the power shaft 36 is mounted by two spaced bearings 49 in an eccentric means 50 controlled by a handle 51.

For the purpose of journalling the eccentric means 50, the transmission housing 26 is provided with a cylindrical extension 52. As shown in Figs. 3 and 4, the end of the cylindrical extension 52 is provided with an integral flange 53, which flange is formed with two diametrically opposite latching recesses 55, Fig. 5.

The eccentric means 50 is journalled in the cylindrical housing extension 52 and has its forward end protruding therefrom. Preferably the protruding forward end of the eccentric means carries a sheet metal dust cap or seal 56 secured thereon by a cap screw 57, the cap retaining suitable gasket means 58 embracing the power shaft 36.

The handle 51 is mounted in a suitable radial recess in the eccentric means 50 and is held in place by a suitable pin 60. Slidingly mounted on the handle 51 is a suitable latch member 61 that is continuously urged inwardly by a suitable spring 62 surrounding the handle in compression between the latch member and a nut 63 on the end of the handle. The latch member 61 is formed with a pair of finger grips 65, a detent portion 66 for releasable engagement with the recesses 55 and a pair of wings 67 positioned for sliding engagement with the face of the radial flange 53.

The manner in which the invention operates may be readily understood from the foregoing description. The drawings show the various parts positioned for raking operation. It will be noted that the handle 51 is in the rightward position, as viewed in Fig. 4, and that the pinion 40 of the pinion means 37 is in mesh with the smaller bevel gear 33. In making the changeover to tedding operation, the operator grasps the handle 51 with two fingers extending under the finger grips 65, lifts the latch member 61 out of engagement with the right latching recess 55 and swings the handle through 180 degrees to a position at which the latch member engages the opposite recess 55. In the course of moving the handle through the 180-degree arc, the operator may release the latch member so that the spring 62 will automatically force the detent 66 of the latch member into engagement with the recess 55 at the end of the 180-degree movement.

The particular gear ratios involved in Fig. 3 provide the proper speed differential between raking and tedding operations desired for the combined rake and tedder disclosed in my previously mentioned patent. The speed ratio may, of course, be varied for different agricultural implements. It is obvious from Fig. 3 that if for the sake of increased speed differential the bevel gear 34 is increased in diameter by a certain amount, the outer pinion 40 of the pinion means 37 may be moved into engagement with the bevel gear 34 as well as moved into engagement with the bevel gear 33 and therefore the second pinion 41 of the pinion means may be omitted.

The preferred form of my invention described in detail herein suggests various changes and modifications that will occur to those skilled in the art and I reserve the right to all such departures that properly come within the terms of my appended claims.

I claim:

1. In a two speed reversible transmission for an agricultural implement, a driven shaft, two spaced bevel gears of different diameter fixedly secured to said shaft, a driving shaft disposed at an acute angle with respect to said driven shaft, two bevel pinions fixedly secured to said drive shaft, one of said pinions having its teeth disposed inwardly toward said driven shaft beyond the teeth of the smaller of said bevel gears, the other of said pinions having its teeth on the side thereof adjacent the smaller of said bevel gears disposed inwardly toward said driven shaft beyond the outer extremity of the larger of said bevel gears and its teeth on the opposite side disposed outwardly from said driven shaft beyond the outer extremity of the larger of said bevel gears, a handle for selectively shifting said drive shaft in two alternate positions, and means for locking said handle in either of the alternate positions.

2. In a two speed reversible transmission for an agricultural implement, a driven shaft, two bevel gears of different diameter keyed to said driven shaft, a sleeve on said driven shaft for maintaining said bevel gears in spaced relationship with respect to each other, a drive shaft disposed at an acute angle to said driven shaft, two bevel pinions on said drive shaft, one of said pinions having its teeth on the side adjacent the smaller of said bevel gears disposed inwardly toward said driven shaft beyond the teeth on the smaller of said bevel gears and its teeth on the opposite side of said pinion disposed to engage the teeth of the larger of said bevel gears in one condition of operation and to clear said teeth on said larger bevel gear in all other conditions of operation, the other of said pinions having its teeth on the side adjacent the smaller of said bevel gears positioned to engage the teeth on the smaller of said bevel gears in another condition of operation and its teeth on the opposite side thereof disposed outwardly from said driven shaft beyond the teeth of the larger of said bevel gears, a handle for selectively shifting said drive shaft into one of two operative positions, and means exterior of said transmission for locking said handle in either of said positions.

3. In a two speed reversible transmission for an agricultural implement, a transmission housing, a driven shaft rotatably mounted in said housing, two spaced bevel gears of different diameter fixedly secured to said shaft, a housing extension having a cylindrical portion disposed at an acute angle to said driven shaft, an eccentric bearing rotatably mounted in said housing, a drive shaft disposed at an acute angle to said driven shaft rotatably mounted in said bearing, two bevel pinions on said drive shaft, one of said pinions having its teeth on the side adjacent the smaller of said bevel gears disposed inwardly toward said driven shaft beyond the teeth on said bevel gear and its teeth on the opposite side of said pinion disposed to engage the teeth of the larger of said bevel gears in one condition of operation and to disengage said teeth in all other conditions of operation, the other of said pinions having its teeth on the side adjacent the smaller of said bevel gears positioned to engage the teeth of said smaller bevel gears in another condition of operation and its teeth on the opposite side thereof disposed outwardly from said driven shaft beyond the teeth of the larger of said bevel gears in all conditions of operation, a handle adjacent the end of said housing extending radially from said sleeve for rotating said eccentric bearing to selectively shift said drive shaft into one of two operative positions, an outwardly extending flange adjacent the end of said housing extension, diametrically opposed recesses in said flange, a latch member slidably mounted on said handle, detents on said latch member adapted to selectively engage said recesses, and a spring normally urging said latch member toward said flange, said detents and recesses being positioned to selectively lock said driving shaft into one of two alternate operative positions.

THEODORE H. OPPENHEIM.

REFERENCES CITED

The following references are of record in the file of this patent:

UNITED STATES PATENTS

| Number | Name | Date |
| --- | --- | --- |
| 88,951 | Foot | Apr. 13, 1869 |
| 214,167 | McGowen | Apr. 8, 1879 |
| 594,444 | Tetrault | Nov. 30, 1897 |
| 675,425 | Sturtevant | June 4, 1901 |
| 853,120 | Salter | May 7, 1907 |
| 928,457 | Jones | July 20, 1909 |
| 996,255 | Jones et al. | June 27, 1911 |
| 1,097,342 | Lorenz | May 19, 1914 |
| 1,256,178 | Smith | Feb. 12, 1918 |
| 1,864,992 | Fatland | June 28, 1932 |
| 2,197,361 | Gordon | Apr. 16, 1940 |
| 2,255,288 | Jones | Sept. 9, 1941 |
| 2,312,924 | Morey | Mar. 2, 1943 |

FOREIGN PATENTS

| Number | Country | Date |
| --- | --- | --- |
| 15,522 | Great Britain | July 5, 1913 |
| 135,230 | Germany | Oct. 22, 1902 |
| 412,596 | France | Feb. 14, 1910 |